United States Patent
Schade et al.

(10) Patent No.: US 6,506,846 B1
(45) Date of Patent: Jan. 14, 2003

(54) METHOD FOR PRODUCING IMPACT-RESISTANT MODIFIED THERMOPLASTIC MOULDING MATERIALS

(75) Inventors: Christian Schade, Ludwigshafen (DE); Hermann Gausepohl, Mutterstadt (DE); Wolfgang Fischer, Walldorf (DE); Rainer Moors, Germersheim (DE); Volker Warzelhan, Weisenheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/582,882

(22) PCT Filed: Jan. 26, 1999

(86) PCT No.: PCT/EP99/00480

§ 371 (c)(1),
(2), (4) Date: Jul. 6, 2000

(87) PCT Pub. No.: WO99/40135

PCT Pub. Date: Aug. 12, 1999

(30) Foreign Application Priority Data

Feb. 7, 1998 (DE) .......................... 198 04 912
Jun. 24, 1998 (DE) .......................... 198 28 104

(51) Int. Cl.[7] ..................... C08F 257/02; C08F 279/02; C08F 279/04
(52) U.S. Cl. ................. 525/316; 525/244; 525/247; 525/249; 525/89
(58) Field of Search ................. 525/316, 244, 525/247, 249, 89

(56) References Cited

U.S. PATENT DOCUMENTS

| 4,153,647 A | | 5/1979 | Glukhovskoi |
| 5,096,970 A | * | 3/1992 | Hattori et al. .............. 525/268 |
| 5,247,020 A | * | 9/1993 | Nakano et al. ............. 525/249 |

FOREIGN PATENT DOCUMENTS

| DE | 42 35 978 | 4/1994 |
| EP | 059 231 | 9/1982 |
| EP | 304 088 | 2/1989 |
| EP | 334 715 | 9/1989 |
| EP | 595 121 | 5/1994 |
| GB | 1013205 | 12/1965 |
| WO | 97/33923 | 9/1997 |
| WO | 98/07765 | 2/1998 |
| WO | 98/07766 | 2/1998 |

OTHER PUBLICATIONS

J.Am.Chem.Soc., vol. 82 (1960), 6000–6005, Welsch.

* cited by examiner

Primary Examiner—James J. Seidleck
Assistant Examiner—Olga Asinovsky
(74) Attorney, Agent, or Firm—Keil & Weinkauf

(57) ABSTRACT

A process prepares impact-modified thermoplastic molding compositions which comprise a soft phase made from a rubber dispersed in a hard matrix composed of vinylaromatic monomers, where the hard matrix is prepared by anionic polymerization in the presence of a metal alkyl compound or a metal aryl compound of an element of the second or third main group, or of the second subgroup, of the Periodic Table.

9 Claims, No Drawings

METHOD FOR PRODUCING IMPACT-RESISTANT MODIFIED THERMOPLASTIC MOULDING MATERIALS

The invention relates to a process for preparing impact-modified thermoplastic molding compositions which comprise a soft phase made from a rubber dispersed in a hard matrix composed of vinylaromatic monomers.

There are various known continuous and batch processes, in solution or suspension, for preparing impact-modified polystyrene. In these processes a rubber, usually polybutadiene, is dissolved in monomeric styrene, which is polymerized in a preliminary reaction to a conversion of about 30%. The formation of polystyrene and the associated depletion of monomeric styrene results in a change in the phase coherence. During this process, known as phase inversion, grafting reactions also occur on the polybutadiene and these, together with the intensity of agitation and the viscosity, affect the formulation of the disperse soft phase. The polystyrene matrix is built up in the main polymerization which follows. Processes of this type, carried out in various types of reactor, are described, for example, in A. Echte, Handbuch der technischen Polymerchemie, VCH Verlagsgesellschaft Weinheim, Germany, 1993, pages 484–489 and in U.S. Pat. Nos. 2,727,884 and 3,903,202.

These processes require complicated comminution and dissolving of the separately prepared rubber, and the resultant polybutadiene rubber solution in styrene has to be filtered before the polymerization to remove gel particles.

The required solution of rubber in styrene may also be prepared by anionic polymerization of butadiene or butadiene/styrene in nonpolar solvents, such as cyclohexane or ethylbenzene, followed by addition of styrene (GB 1 013 205 and EP-A-0 334 715) or by incomplete conversion of butadiene in styrene (EP-A 0 059 231 and EP-A 0 304 088) followed by removal of the unconverted butadiene. The rubber solution is then subjected to a free-radical polymerization.

Processes for preparing thermoplastic molding compositions by anionic polymerization of styrene in the presence of a rubber are known, for example, from DE-A-42 35 978 and U.S. Pat. No. 4,153,647. The resultant impact-modified products have lower contents of residual monomers and oligomers, compared with the products obtained via free-radical polymerization.

Anionic polymerization of styrene proceeds very rapidly and gives very high conversions. The high polymerization rate and the heat generation associated with this mean that on an industrial scale these processes are restricted to very dilute solutions, low conversions or low temperatures.

Alkyl compounds of alkaline earth metals, of zinc and of aluminum have therefore been described as retardant additives for anionic polymerization of styrene (WO 97/33923 and WO 98/07765) or butadiene in styrene (WO 98/07766). Controlled anionic polymerization of styrene and butadiene to give homopolymers or styrene-butadiene copolymers is possible with these additives.

WO 98/07766 moreover describes the continuous preparation of impact-modified molding compositions using the styrene-butadiene rubbers which can be obtained by means of the retardant additives in styrenic solution. However, the rubbers obtainable by this process always comprise small amounts of copolymerized styrene in the butadiene blocks.

It is an object of the invention to avoid the disadvantages mentioned and to develop a process which permits the preparation of impact-modified molding compositions which are low in residual monomers and in oligomers. The process should furthermore ensure simple and reliable control of the reaction. It should be suitable for using a very large number of types of rubber, in order to permit a wide range of properties in the impact-modified molding compositions.

Another object was a continuous process for anionic polymerization of impact-modified molding compositions with simple and reliable control of the reaction.

We have found that this object is achieved by means of a process for preparing impact-modified thermoplastic molding compositions which comprise a soft phase made from a rubber dispersed in a hard matrix composed of vinylaromatic monomers, where the hard matrix is prepared by anionic polymerization in the presence of a metal organyl compound of an element of the second or third main group, or of the second subgroup, of the Periodic Table.

Metal organyl compounds of an element of the second or third main group, or of the second subgroup, of the Periodic Table which may be used are the organyl compounds of the elements Be, Mg, Ca, Sr, Ba, B, Al, Ga, In, Tl, Zn, Cd, Hg. These metal organyl compounds are also termed retarders, due to their effect during anionic polymerization. Preference is given to the magnesium and aluminum organyl compounds. For the purposes of the invention, organyl compounds are the organometallic compounds of the elements mentioned with at least one metal-carbon a bond, in particular the alkyl or aryl compounds. The metal organyl compounds may also contain, on the metal, hydrogen, halogen, or organic radicals bonded via heteroatoms, giving compounds, such as alcoholates or phenolates. The latter are obtained, for example, by complete or partial hydrolysis, alcoholysis or aminolysis. It is also possible to use mixtures of different metal organyl compounds.

Suitable magnesium organyl compounds have the formula $R_2Mg$, where R, independently of one another, are hydrogen, halogen, $C_1$–$C_{20}$-alkyl or $C_6$–$C_{20}$-aryl. Preference is given to dialkylmagnesium compounds, in particular the ethyl, propyl, butyl or octyl compounds which are commercially available products. Particular preference is given to (n-butyl)(sec-butyl)magnesium, which is soluble in hydrocarbons.

Aluminum organyl compounds of the formula $R_3Al$ may be used, where R, independently of one another, are hydrogen, halogen, $C_1$–$C_{20}$-alkyl or $C_6$–$C_{20}$-aryl. Preferred aluminum organyl compounds are the aluminum trialkyl compounds, such as triethylaluminum, triisobutylaluminum, tri-n-butylaluminum, triisopropylaluminum and tri-n-hexylaluminum. Particular preference is given to triisobutylaluminum. Use may also be made of aluminum organyl compounds produced by partial or complete hydrolysis, alcoholysis, aminolysis or oxidation of aluminum alkyl compounds or of aluminum aryl compounds. Examples of these are diethylaluminum ethoxide, diisobutylaluminum ethoxide, diisobutyl(2,6-di-tert-butyl-4-methylphenoxy) aluminum (CAS No. 56252-56-3), methylaluminoxane, isobutylated methylaluminoxane, isobutylaluminoxane, tetraisobutyldialuminoxane and bis(diisobutyl)aluminum oxide.

The retarders described generally do not act as polymerization initiators. The anionic polymerization initiators used are usually mono-, bi- or polyfunctional alkali metal alkyl compounds, alkali metal aryl compounds or alkali metal aralkyl compounds. It is useful to use organolithium compounds, such as ethyl-, propyl-, isopropyl-, n-butyl-, sec-butyl-, tert-butyl-, phenyl-, diphenylhexyl-, hexamethylenedi-, butadienyl-, isoprenyl- or polystyryllithium, or the polyfunctional compounds 1,4- dilithiobutane, 1,4-dilithio-2-butene or 1,4-dilithiobenzene. The amount of alkali metal organyl compound required depends on the desired molecular weight and on the type and amount of the other metal organyl compounds used, and also on the polymerization temperature. It is generally in the range from 0.002 to 5 mol percent, based on the total amount of monomers.

Preferred vinylaromatic monomers for the hard matrix are styrene, α-methylstyrene, p-methylstyrene, ethylstyrene, tert-butylstyrene, vinyltoluene and 1,1-diphenylethylene, or mixtures. Styrene is particularly preferred.

The rubber used for the soft phase may be any desired diene rubber or acrylate rubber, or mixtures which have a certain compatibility with the vinylaromatic hard matrix. It is therefore advantageous if the rubber comprises a certain proportion of styrene blocks, since the anionic polymerization of the hard matrix does not produce any compatibility of the rubber via grafting of monomers which form the hard matrix.

The rubber used is preferably a styrene-butadiene block copolymer or a mixture of a styrene-butadiene block copolymer with a homopolybutadiene, where the styrene content, based on the entirety of the rubber, is in the range from 5 to 50% by weight, preferably from 10 to 45% by weight, particularly preferably from 20 to 40% by weight. The content of residual butadiene in the rubber should be less than 200 ppm, preferably less than 100 ppm, in particular less than 50 ppm.

In a preferred version of the process the rubber solution is prepared in a first step by the usual methods of anionic polymerization and styrene is used for dilution. In a second step without further addition of solvents the hard matrix is polymerized with phase inversion to a conversion of at least 90%, based on the hard matrix.

It is useful to polymerize the rubber in an aliphatic, isocyclic or aromatic hydrocarbon or hydrocarbon mixture, preferably in benzene, toluene, ethylbenzene, xylene, cumene or cyclohexane. Toluene and ethylbenzene are particularly preferred. The polymerization of the rubber may also be carried out in the presence of liquid additives. These are usually not added until during or after the polymerization of the hard matrix. The rubber may, for example, be prepared in mineral oil or in a mixture of mineral oil and the abovementioned hydrocarbons. This makes it possible to reduce the viscosity or the amount of solvent.

A very high solids content is selected for the resultant solution. Its upper limit is principally determined by the viscosity of the solution. When a styrene-butadiene rubber is used, the viscosity, and therefore the possible solids content, depends inter alia on the block structure and the content of styrene. It is useful to select a solids content in the range from 15 to 50% by weight, preferably from 20 to 40% by weight.

The polymerization of the rubber may be carried out continuously or batchwise with a buffer tank. Continuous preparation may be carried out in continuous stirred tank reactors (CSTRs), such as stirred-tank reactors (or stirred-reactor cascades) or in circulating reactors or plug-flow reactors (PFRs), such as tubular reactors with or without internals, or in combinations of various reactors. Batchwise preparation is preferably carried out in a stirred-tank reactor.

The rubbers may be polymerized in the presence of a polyfunctional alkali metal organyl compound, or linked to give a star shape during or after the polymerization using a polyfunctional coupling agent, such as polyfunctional aldehydes, ketones, esters, anhydrides or epoxides. Symmetrical or asymmetrical star block copolymers can be obtained here by coupling of identical or different blocks.

After completion of the polymerization, the living polymer chains may be closed off with a chain terminator instead of a coupling procedure. Suitable chain terminators are protonating substances or Lewis acids, such as water, alcohols, aliphatic or aromatic carboxylic acids, or also inorganic acids, such as carbonic or boric acid. The amount of chain terminator added is in proportion to the amount of living chains.

It is useful to dilute the solution directly after the end of the reaction with the vinylaromatic monomer, in order to make subsequent handling easier.

The resultant rubber solution is polymerized as described above in a second step, if desired with addition of further vinylaromatic monomer.

The conversion, based on the vinylaromatic monomer of the hard matrix, is generally greater than 90%. The process may in principle also give complete conversion.

The content of rubber, based on the entire molding composition, is usefully from 5 to 25% by weight. It essentially depends on the type of rubber used and on the desired properties of the impact-modified molding composition.

The solids content achieved at the end of the reaction in the second step is generally in the range from 70 to 90%, in particular from 75 to 85%, for the abovementioned ranges of solids content of the rubber solution and the usual rubber content in the molding composition.

Surprisingly, it has been found that the polymerization of the hard matrix can be carried out without further addition of anionic polymerization initiator if use is made of a rubber solution which, as described above, has been prepared by anionic polymerization and terminated by chain termination or coupling. In this case, the metal alkyl compounds, which otherwise have only a retarding effect, can initiate the polymerization of the hard matrix. This results in simpler metering and control than when using an initiator/retarder mixture.

The anionic polymerization of the hard matrix in the second reaction zone is preferably initiated exclusively by addition of a magnesium dialkyl compound. Preference is given to a magnesium dialkyl compound which contains at least one secondary or tertiary alkyl group. (N-butyl)(s-butyl)magnesium is very particularly preferred.

The polymerization of the rubber and of the hard matrix may be carried out batchwise or continuously in stirred-tank reactors, circulating reactors, tubular reactors, tower reactors or rotating-disk reactors, as described in WO 97/07766.

The resultant molding compositions may be freed from solvents and from residual monomers in a conventional manner, by using devolatilizers or vented extruders at atmospheric pressure or reduced pressure and at temperatures of from 190 to 320° C. The solvent removed may be reintroduced to the rubber synthesis if desired after a purification step. To avoid accumulation of contaminants, a relatively small amount of the solvent may be removed from the process and used at another time.

The resultant product has a content of less than 200 ppm of residual monomers, preferably less than 100 ppm, in particular less than 50 ppm.

It can be useful to crosslink the rubber particles, by controlling the temperature appropriately and/or by adding peroxides, in particular those with a high decomposition temperature, such as dicumyl peroxide.

EXAMPLES

Synthesis of Rubber Solutions

The molecular weights and molecular weight distributions were determined by gel permeation chromatography (GPC) in tetrahydrofuran and evaluating the resultant chromatograms using calibration by polystyrene or by polybutadiene.

The styrene content and 1,2-vinyl content of the butadiene fraction in the rubber was determined by evaluating $^1$H nuclear resonance spectroscopic data.

Example 1

14 kg of dry toluene were charged to a stirred-tank reactor of 50 l capacity and mixed, with stirring, with 1610 g of butadiene. The mixture was heated to 40° C. and mixed at this temperature with 19.4 g of a 1.5 molar solution of sec-butyllithium in cyclohexane. Once the polymerization had started, the internal temperature rose to a maximum of 72° C. After 17 min a further 2168 g of butadiene were added within a period of 15 min at an internal temperature of from 66 to 77° C., and the mixture was stirred for a further 30 min at 65° C. 2222 g of styrene were then added. The temperature had now risen to 71° C. After 60 min, 1.6 g of isopropanol were used for termination. The solution had a solids content of 30% by weight. Addition of 20 kg of styrene gave a rubber solution with a solids content of 17.5% by weight.

The resultant butadiene-styrene block copolymer had an average molecular weight of $M_w$=308,000 g/mol and a polydispersity $M_w/M_n$ of 1.09 (determined by gel permeation chromatography, GPC, polystyrene calibration). The residual butadiene content was less than 10 ppm. The styrene content was 37%; 9% of the butadiene fraction of the rubber was of the 1,2-vinyl type (determined by $^1$H nuclear resonance spectroscopy). The solution viscosity of a 5.43% strength solution of the rubber in toluene was 42 mPas.

Example 2

14 kg of dry toluene were charged to a stirred-tank reactor of 50 l capacity and mixed, with stirring, with 1612 g of butadiene. The mixture was heated to 32° C. and mixed at this temperature with 17.4 g of a 1.33 molar solution of sec-butyllithium in cyclohexane. The solution was heated to 62° C. within a period of 20 min. A further 2813 g of butadiene were added at an internal temperature of from 62 to 79° C. within a period of 25 min. The mixture was stirred for a further 30 min at 65° C. Some of the butadiene blocks produced were then coupled using 52 ml of a 2% strength by weight solution of ethyl acetate, and 1575 g of styrene were then added. The temperature had now risen to 69° C. After 60 min, 1.4 ml of isopropanol were used for termination. The solution had a solids content of 30% by weight. Addition of 20 kg of styrene gave a rubber solution with a solids content of 17.5% by weight. The resultant polymer mixture had bimodal distribution with a principal molar mass peak at $M_P$=329,000 g/mol and another peak at $M_P$=166,000 g/mol (GPC, polybutadiene calibration). The residual butadiene content was less than 10 ppm. The styrene content of the rubber isolated was 26%. 12% of the butadiene fraction of the rubber was of the 1,2-vinyl type ($^1$H NMR). The solution viscosity of a 5.43% strength solution of the rubber in toluene was 97 mPas.

Examples 3 to 5 were carried out in a similar manner using, respectively, phenylacetylene, ethyl acetate and diethyl adipate as coupling agents. The parameters and results from the rubber solutions are given in Table 1:

TABLE 1

| Example | 2 | 3 | 4 | 5 |
| --- | --- | --- | --- | --- |
| Coupling agent or additive | Ethyl acetate | Phenylacetylene | Ethyl acetate | Diethyl adipate |
| Amount[a] | 0.9 g | 1.0 g | 0.9 g | 0.5 g |
| Styrene fraction in the rubber | 25% | 30% | 15% | 20% |
| Solids content at the end of the reaction | 30% | 37% | 35% | 30% |
| Solids content after dilution with styrene | 17.5% | 17.5% | 17.5% | 12% |
| Solution viscosity (5.43% in toluene) | 97 mPas | 55 mPas | 101 mPas | 174 mPas |

[a]Metered in as a 2% strength by weight solution in toluene

Example 6

13.8 kg of dry toluene in a stirred-tank reactor of 50 l capacity were mixed, with stirring, with 228 g of styrene and 14.2 ml of a 1.33 molar solution of sec-butyllithium in cyclohexane. The solution was heated to 50° C. within a period of 15 min. 3570 g of butadiene were then added within a period of 25 min, whereupon the internal temperature rose to 74° C. The mixture was stirred for a further 30 min at 65° C. 2100 g of styrene were then added. The temperature had now risen to 70° C. After 60 min, 1.4 ml of isopropanol were added to the reaction mixture. At this juncture the solution had a solids content of 30% by weight. The solids content was adjusted to 15% by weight by adding styrene to the mixture. GPC analysis of the resultant polymer mixture showed a distribution with a principal molar mass peak at $M_P$=296,000 g/mol and a shoulder at $M_P$=225,000 g/mol, using polybutadiene calibration. The residual butadiene content was less than 10 ppm. $^1$H NMR gave the styrene content of the rubber isolated as 39%. 11% of the butadiene fraction of the rubber was of the 1,2-vinyl type. The solution viscosity of a 5.43% strength solution of the rubber in toluene was 54 mPas.

HIPS syntheses

Yield stress and elongation at break were determined at 23° C. in accordance with DIN 53455. The test specimens used were produced in accordance with ISO 3167. The hole notched impact strength was determined in accordance with DIN 53753 at 23° C. on a test specimen of dimensions 50 mm×6 mm×4 mm (with a hole diameter of 3 mm).

Example 7

A double-walled 3 l stirred-tank reactor with a Standard anchor stirrer was used for the continuous polymerization. The reactor was designed for a pressure of 60 bar and was temperature-controlled with a heat-transfer medium for isothermal polymerization.

394 g/h of styrene, 686 g/h of the rubber solution from Example 1 and 17 g/h of a 0.16 molar solution of (n-butyl)(s-butyl)magnesium in heptane/toluene (1:4 parts by weight) were metered continuously, with stirring at 100 rpm, into the stirred-tank reactor, and stirred at a constant temperature of the mixture of 79° C.

The material discharged from the stirred-tank reactor was conveyed onward into two agitated 4-liter tower reactors arranged in series. The first tower reactor was operated at an internal temperature of 92° C. In the second tower reactor the temperature was adjusted by means of two heating zones of equal length arranged in series in such a way that the internal temperature at the end of the first zone was 124° C. and at the end of the second zone was 158° C. At the exit from the tower reactor the polymerization mixture was mixed in a mixer with 5 g/h of methanol and then passed through a tubular section heated to 260° C. and passed, with pressure reduction, via a pressure-control valve into a low-pressure vessel maintained at 25 mbar. The melt was discharged using a screw and pelletized.

After a few hours a stable equilibrium condition became established in all parts of the system. The pressure drop across the entire system was 2.9 bar. The solids content was 26% by weight at the exit from the stirred-tank reactor, 58% by weight at the exit from the first tower reactor, and 73% by weight at the exit from the second tower reactor, corresponding to 100% monomer conversion. The polystyrene matrix had a molecular weight $M_w$ of 164,500 g/mol and a polydispersity $M_w/M_n$ of 2.95. The distribution was monomodal. Determinations on the impact-modified polystyrene (or on the matrix?) gave a content of less than 5 ppm of styrene, less than S ppm of ethylbenzene and 83 ppm of toluene. The impact-modified polystyrene had a yield stress of of 27 N/mm$^2$, elongation at break of 25% and hole notched impact strength of 12 kJ/m$^2$.

The vapors collected in the devolatilization unit were utilized, after distillation, for another rubber synthesis of Example 1.

Example 8

511 g/h of styrene, 488 g/h of the rubber solution from Example 2 and 17.4 g/h of a 0.16 molar solution of (n-butyl)(s-butyl)magnesium in heptane/toluene (1:4 parts by weight), were metered continuously, with stirring at 100 rpm, into the stirred-tank reactor of Example 8 and stirred at a constant temperature of the mixture of 86° C.

The material discharged from the stirred-tank reactor was conveyed onward into a double-walled tubular reactor with an internal diameter of 29.7 mm and a length of 2100 mm. The tubular reactor was designed for a pressure of up to 100 bar and for a temperature of up to 350° C. The tubular reactor was temperature-controlled via a cocurrently conducted heat-transfer medium, and the temperature of the polymerization mixture was determined via three temperature sensors distributed uniformly over the reaction path. The temperature of the heat-transfer medium at the entry to the tubular reactor was 105° C. The highest temperature of the polymerization solution was achieved at the end of the tubular reactor, with 184° C.

After the polymerization mixture had left the tubular reactor a 20% strength by weight solution of methanol in toluene was added at 10 ml/h using a HPLC pump, and a downstream tubular section with a static mixture was used to homogenize the mixture. The polymer melt is passed, with pressure reduction, via a throttle valve into a devolatilization vessel maintained at 20 mbar, drawn off using a screw pump, extruded and pelletized.

After a short time a stable equilibrium condition became established in all parts of the system. The pressure drop across the entire system was 2.2 bar. The solids content was 41% by weight at the exit from the stirred-tank reactor and 79% by weight at the exit from the tubular reactor, corresponding to 100% monomer conversion. The polystyrene matrix had a molecular weight $M_w$ of 169,000 g/mol and a polydispersity $M_w/M_n$ of 2.62.

Determination gave a content of less than 5 ppm of styrene, less than 5 ppm of ethylbenzene and 102 ppm of toluene. The impact-modified polystyrene had a yield stress of 29 N/mm$^2$, elongation at break of 20% and hole notched impact strength of 11 kJ/m$^2$.

The vapors collected in the devolatilization unit were utilized in Example 2, after distillation, for another rubber synthesis.

Example 9

The reactor used was a double-walled tubular reactor with an internal diameter of 29.7 mm and a length of 4200 mm. The tubular reactor was designed for a pressure of up to 100 bar and for a temperature of up to 350° C. The tubular reactor was divided into two zones of equal length, each temperature-controlled via a cocurrently conducted heat-transfer medium. The temperatures of, respectively, the polymerization mixture and the heat-transfer medium were determined via three temperature sensors uniformly distributed over the reaction path.

387 g/h of styrene, 588 g/h of the rubber solution from Example 3 and 17.5 g/h of an initiator solution were metered continuously into the tubular reactor. 100 g of the initiator solution were composed of 24 g of a 0.8 molar solution of (n-butyl)(s-butyl)magnesium in heptane, 1 g of a 1.6 M solution of sec-butyllithium in cyclohexane and 75 g of toluene. The temperature of the heat-transfer medium at the point of entry into the first reactor section was 100° C. The temperature of the polymerization solution at the end of the first reactor section was 134° C. The temperature of the heat-transfer medium at the entry into the second reactor section was 80° C. The temperature of the polymerization solution at the end of the second tubular reaction section averaged 183° C.

After the polymerization mixture had left the tubular reactor a 20% strength by weight solution of methanol in toluene was added at 10 ml/h using a HPLC pump, and a downstream tubular section with a static mixture was used to homogenize the mixture. The polymer melt is passed, with pressure reduction, via a throttle valve into a devolatilization vessel maintained at 17 mbar, drawn off using a screw pump, extruded and pelletized.

After a short time stable conditions became established in all parts of the system. The pressure drop across the entire system was 2.1 bar. The solids content was 31% by weight at the end of the first section of the tubular reactor and 80% by weight at the exit from the tubular reactor. The polystyrene matrix had a molecular weight $M_w$ of 185,000 g/mol and a polydispersity $M_w/M_n$ of 2.12. Determination gave a content of 12 ppm of styrene, less than 5 ppm of ethylbenzene and 87 ppm of toluene. The impact-modified polystyrene had a yield stress of 26 N/mm$^2$, elongation at break of 23% and hole notched impact strength of 11 kJ/m$^2$.

The vapors collected in the devolatilization unit were utilized as in Example 3, after distillation, for another rubber synthesis.

Example 10

538 g/h of the rubber solution from Example 4 and 682 g/h of styrene were metered continuously, with stirring at 100 rpm, into a 3-liter stirred-tank reactor operated under pressure and equipped with an anchor stirrer. Separately from this, a mixture of 25 g/h of a 0.32 molar solution of sec-butyllithium in cyclohexane/toluene (weight ratio 1:4) and 24 g/h of a 4% strength by weight triisobutylaluminum solution in toluene were metered into the reactor. To prepare this mixture the components were mixed continuously in a tubular section of 12.5 ml capacity and passed into the reactor. The stirred-tank reactor was controlled by a thermostat to an internal temperature of 109° C.

The solution was conveyed onward into a 4-liter agitated tower reactor, operated at an internal temperature of 110° C.

The material discharged from the reactor was introduced into a second 4-liter tower reactor provided with two identically sized heating zones. The first zone was controlled to an internal temperature of 121° C. and the second to 158° C. The material discharged from the reactor was mixed with 20 g/h of a 10% strength by weight solution of methanol in toluene, passed through a mixer and then a tubular section heated to 260° C., and, with pressure reduction, via a pressure-control valve into a low-pressure vessel operated at 25 mbar. The melt was discharged using a screw, and pelletized.

After a few hours constant operating conditions became established. The solids content was 29% by weight at the exit from the first reactor and 56% by weight after the first tower. Quantitative conversion was found at the exit from the continuous system. The pressure drop across the entire system was 2.3 bar. The polystyrene matrix had a molecular weight $M_w$ of 162,400 g/mol and polydispersity $M_w/M_n$ of 2.68. The distribution was monomodal. Determination gave a content of less than 5 ppm of styrene, less than 5 ppm of ethylbenzene and 112 ppm of toluene. The impact-modified polystyrene had a yield stress of 17 N/mm$^2$, elongation at break of 35% and hole notched impact strength of 14 kJ/m$^2$.

The vapors collected in the devolatilization unit were utilized, after distillation, for another rubber synthesis as in Example 4.

Example 11

1252 g/h of the rubber solution from Example 5 and 603 g/h of styrene were metered continuously, with stirring at 100 rpm, into a 3-liter stirred-tank reactor operated under pressure and equipped with an anchor stirrer. Separately from this, a mixture of 37 g/h of a 0.32 molar solution of sec-butyllithium in cyclohexane/toluene (weight ratio 1:4) and 18 g/h of an 8% strength by weight triisobutylaluminum solution in toluene were metered into the reactor. For this the components were mixed continuously in a tubular section of 12.5 ml capacity and passed into the reactor. The stirred-tank reactor was controlled by a thermostat to an internal temperature of 112° C.

The solution was conveyed onward into a 4-liter agitated tower reactor, provided with two identically sized heating zones. The first zone was controlled to an internal temperature of 125° C. and the second to 172° C. The material discharged from the reactor was mixed with 20 g/h of a 10% strength by weight solution of methanol in toluene, passed through a mixer and then a tubular section heated to 260° C., and, with pressure reduction, via a pressure-control valve into a low-pressure vessel operated at 25 mbar. The melt was discharged using a screw, and pelletized.

After a short time constant operating conditions became established. The solids content was 36% by weight at the exit from the first reactor. Quantitative conversion was found at the exit from the continuous system. The polystyrene matrix had a molecular weight $M_w$ of 171,000 g/mol and polydispersity $M_w/M_n$ of 2.83. The distribution was monomodal. Determination gave a content of less than 5 ppm of styrene, less than 5 ppm of ethylbenzene and 96 ppm of toluene. The impact-modified polystyrene had a yield stress of 20 N/mm$^2$, elongation at break of 36% and hole notched impact strength of 15 kJ/m$^2$.

The vapors collected in the devolatilization unit were utilized, after distillation, for another rubber synthesis as in Example 5.

Example 12

A double-walled 1.9 l stirred-tank reactor with a Standard anchor stirrer was used for the continuous polymerization. The reactor was designed for a pressure of 60 bar and was temperature-controlled with a heat-transfer medium for isothermal polymerization.

280 g/h of styrene, 796 g/h of the rubber solution from Example 6 and 19 g/h of a 0.16 molar solution of (n-butyl) (s-butyl)magnesium in heptane/toluene (weight ratio 1:4) were metered continuously, with stirring at 100 rpm, into the stirred-tank reactor, and stirred at a constant temperature of the mixture of 94° C.

The material discharged from the stirred-tank reactor was conveyed onward into two agitated 4-liter tower reactors arranged in series. The first tower reactor was operated at an internal temperature of 102° C. In the second tower reactor the temperature was adjusted by means of two heating zones of equal length arranged in series in such a way that the internal temperature at the end of the first zone was 122° C. and at the end of the second zone was 160° C. At the exit from the tower reactor the polymerization mixture was mixed in a mixer with 5 g/h of a 1:1 methanol/water mixture and then passed through a tubular section heated to 260° C. and passed, with pressure reduction, via a pressure-control valve into a low-pressure vessel maintained at 25 mbar. The melt was discharged using a screw and pelletized.

After a few hours a stable equilibrium condition became established in all parts of the system. The pressure drop across the entire system was 2.8 bar. The solids content was 37% by weight at the exit from the stirred-tank reactor, 58% by weight at the exit from the first tower reactor. Quantitative conversion was found at the exit from the second tower reactor. The polystyrene matrix had a molecular weight $M_w$ of 152,000 g/mol and polydispersity $M_w/M_n$ of 2.62. The distribution was monomodal. Determinations gave a content of less than 5 ppm of styrene, less than 5 ppm of ethylbenzene and 52 ppm of toluene. The material had a yield stress of 28 N/mm$^2$, hole notched impact strength of 13 kJ/m$^2$, heat distortion temperature (Vicat B/50) of 94° C. and melt volume rate MVR of 200/5 (ISO 1133) of 3.9 cm$^3$/10 min. An electron micrograph showed cellular particle morphology. The average particle diameter was 3.2 mm.

We claim:

1. A process for preparing impact-modified thermoplastic molding compositions which comprise a soft phase made from a rubber dispersed in a hard matrix composed of vinylaromatic monomers, wherein, in a first step, a diene rubber is polymerized in the presence of an organometallic compound of an alkali metal, until the content of residual butadiene is less than 200 ppm, and in a second step, vinylaromatic monomers are polymerized by anionic polymerization in the presence of the diene rubber, wherein the anionic polymerization of the vinylaromatic monomers is initiated by the addition of an organometallic compound of magnesium, aluminum or mixtures thereof, and optionally by further addition of an organometallic compound of an alkali metal.

2. A process as claimed in claim 1, wherein the organometallic compound of magnesium is a dialkylmagnesium compound.

3. A process as claimed in claim 1, wherein the organometallic compound of aluminum is a trialkylaluminum compound.

4. A process as claimed in claim 1, wherein the rubber used is a styrene-butadiene block copolymer or a mixture of a styrene-butadiene block copolymer with a homopolybutadiene, where the styrene content, based on the entirety of the rubber, is in the range from 5 to 50% by weight.

5. A process as claimed in claim 1, wherein, in a first step, a rubber solution with a solids content in the range from 15 to 50% by weight is prepared by anionic polymerization of butadiene and styrene in an aliphatic, isocyclic or aromatic hydrocarbon or hydrocarbon mixture in the presence of an organometallic compound of an alkali metal, it is reacted with a terminator and/or coupling agent and then diluted with vinylaromatic monomers, and, in a second step, without further addition of solvents, the hard matrix is polymerized with the phase inversion to a conversion of at least 90%, based on the hard matrix, and wherein in the second step an organometallic compound of magnesium, aluminum or mixtures thereof and optionally an organometallic compound of an alkali metal is added.

6. A process as claimed in claim 5, wherein the hydrocarbon used is a mineral oil.

7. A process as claimed in claim 5, wherein the polymerization of the rubber and of the hard matrix is carried out continuously.

8. A process as claimed in claim 4, wherein the styrene content, based on the entirety of the rubber, is in the range from 20 to 40% by weight.

9. A process as claimed in claim 1, wherein the organometallic compound of an alkali metal is an organolithium compound.

\* \* \* \* \*